(12) United States Patent
Sugiura

(10) Patent No.: US 11,962,883 B2
(45) Date of Patent: Apr. 16, 2024

(54) LENS DRIVING DEVICE, CAMERA MODULE, AND CAMERA MOUNTING DEVICE

(71) Applicant: Taishi Sugiura, Tokyo (JP)

(72) Inventor: Taishi Sugiura, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 346 days.

(21) Appl. No.: 17/312,540

(22) PCT Filed: Dec. 10, 2019

(86) PCT No.: PCT/JP2019/048209
§ 371 (c)(1),
(2) Date: Jun. 10, 2021

(87) PCT Pub. No.: WO2020/122047
PCT Pub. Date: Jun. 18, 2020

(65) Prior Publication Data
US 2022/0060610 A1     Feb. 24, 2022

(30) Foreign Application Priority Data

Dec. 14, 2018 (JP) ................................. 2018-234685
Dec. 14, 2018 (JP) ................................. 2018-234695

(51) Int. Cl.
H04N 23/55     (2023.01)
G02B 7/02      (2021.01)
(Continued)

(52) U.S. Cl.
CPC .............. *H04N 23/55* (2023.01); *G02B 7/023* (2013.01); *G02B 7/08* (2013.01); *G03B 5/00* (2013.01);
(Continued)

(58) Field of Classification Search
CPC ........ H04N 23/55; H04N 23/51; H04N 23/67; G02B 7/023; G02B 7/08; G02B 7/021;
(Continued)

(56) References Cited

U.S. PATENT DOCUMENTS

| 9,568,743 B2* | 2/2017 | Hayashi ................... G03B 3/10 |
| 2011/0199694 A1* | 8/2011 | Kimoto .................... G02B 7/08 |
| | | 359/822 |

(Continued)

FOREIGN PATENT DOCUMENTS

| JP | 2010-217575 | 9/2010 |
| JP | 2011-027926 | 2/2011 |

(Continued)

*Primary Examiner* — Kelly L Jerabek

(57) ABSTRACT

Provided are a lens driving device, a camera module, and a camera mounting device with which miniaturization and weight reduction can be achieved. This lens driving device is provided with: a stationary part; and a movable part configured to be capable of holding a lens part and movably connected to the stationary part, wherein the stationary part has a flat plate-like base, the base has a thick part and a thin part having a smaller thickness than the thick part, and a reinforcing plate is embedded into the thin part. Specifically, the reinforcing plate is formed of a metal material and is embedded into the resin base by insert-molding.

11 Claims, 8 Drawing Sheets

(51) Int. Cl.
  *G02B 7/08*    (2021.01)
  *G03B 5/00*    (2021.01)
  *H04N 23/51*   (2023.01)

(52) U.S. Cl.
  CPC ..... *H04N 23/51* (2023.01); *G03B 2205/0069* (2013.01)

(58) Field of Classification Search
  CPC . G02B 7/026; G02B 7/04; G02B 7/09; G02B 27/646; G03B 5/00; G03B 13/36; G03B 2205/0069; G03B 2205/0007
  See application file for complete search history.

(56) References Cited

U.S. PATENT DOCUMENTS

| | | | |
|---|---|---|---|
| 2012/0025633 A1 | 2/2012 | Lee et al. | |
| 2015/0135703 A1 | 5/2015 | Eddington et al. | |
| 2015/0304561 A1 | 10/2015 | Howarth et al. | |
| 2017/0219842 A1 | 8/2017 | Howarth et al. | |
| 2018/0115636 A1* | 4/2018 | Hu | G02B 7/08 |
| 2019/0041661 A1* | 2/2019 | Murakami | H04N 23/54 |
| 2021/0389552 A1* | 12/2021 | Park | H04N 23/57 |

FOREIGN PATENT DOCUMENTS

| | | |
|---|---|---|
| JP | 2014-160196 | 9/2014 |
| JP | 2015-537247 | 12/2015 |
| JP | 2017-522615 | 8/2017 |
| JP | 6289451 | 2/2018 |
| WO | WO 2018/135423 | 7/2018 |

* cited by examiner

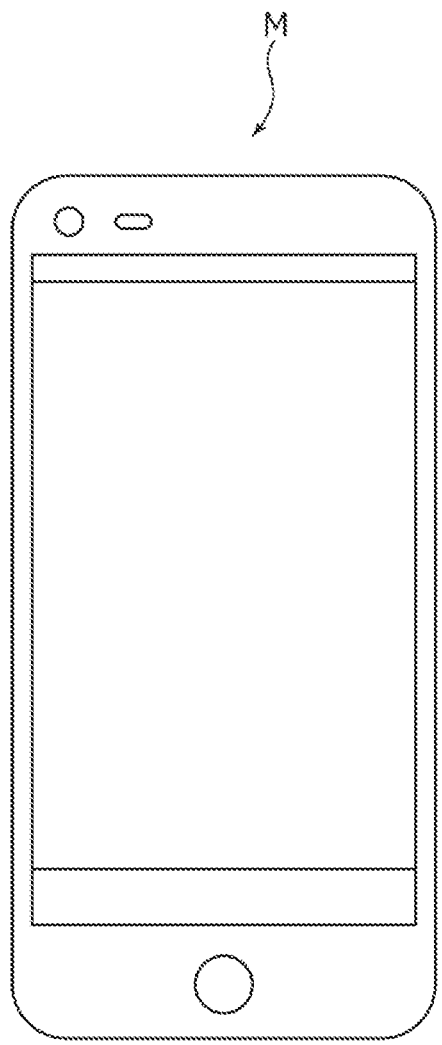
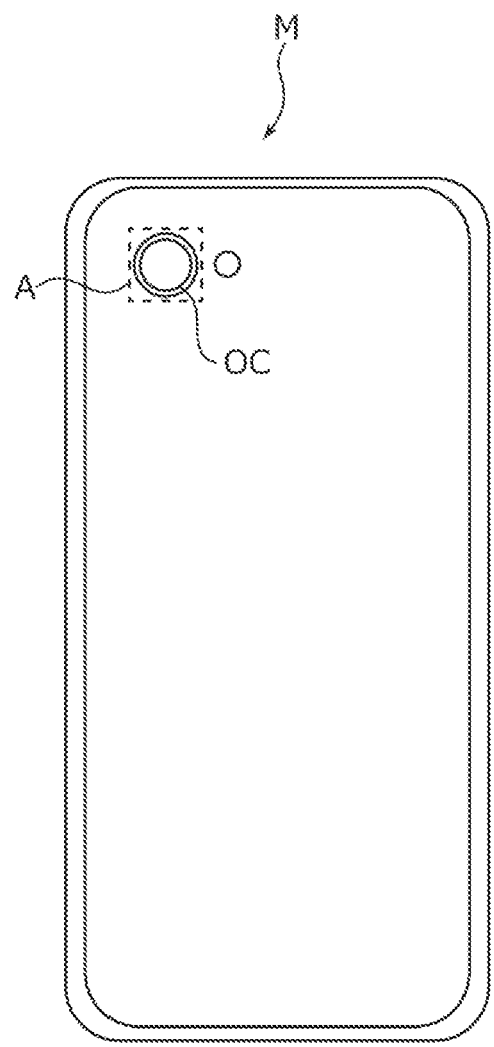
FIG. 1AFIG. 1B

LENS DRIVING DEVICE, CAMERA MODULE, AND CAMERA MOUNTING DEVICE

TECHNICAL FIELD

The present invention relates to a lens driving device, a camera module, and a camera mounting device.

BACKGROUND ART

In general, a small-sized camera module is mounted on a mobile terminal such as a smartphone. In such a camera module, a lens driving device is applied. The lens driving device has an auto-focusing function (hereinafter, referred to as "AF (Auto Focus) function") of automatically performing focusing when a subject is photographed, and a shake-correcting function (hereinafter, referred to as "OIS (Optical Image Stabilization) function") of optically correcting shake (vibration) generated during photographing, thereby reducing irregularities of an image (for example, Patent Literatures (hereinafter, "Patent Literature" will be referred to as "PTL") 1 to 3).

The lens driving devices disclosed in PTLs 1 to 3 include an auto-focusing driving device that moves a lens part in a direction of an optical axis (hereinafter, referred to as "optical axis direction"), and a shake-correcting driving device that moves an auto-focusing element, which includes the auto-focusing driving device, in a plane orthogonal to the optical axis direction. Further, the auto-focusing driving device is placed on a movable stage of the shake-correcting driving device, and is mechanically and electrically connected to a fixing part of the shake-correcting driving device via a flexible printed board.

CITATION LIST

Patent Literature

PTL 1

Japanese Unexamined Patent Application Publication (Translation of PCT Application) No. 2017-522615

PTL 2

Japanese Unexamined Patent Application Publication (Translation of PCT Application) No. 2015-537247

PTL 3

Japanese Patent No. 6289451

SUMMARY OF INVENTION

Technical Problem

In recent years, there has been a request for further miniaturization and weight reduction of lens driving devices in order to realize miniaturization (thickness reduction) and/or weight reduction of camera mounting devices such as smartphones.

An object of the present invention is to provide a lens driving device, a camera module, and a camera mounting device, of which miniaturization and weight reduction can be achieved.

Solution to Problem

A lens driving device according to the present invention includes:
a fixing part;
a movable part configured to be capable of holding a lens part and movably connected to the fixing part; and
a driving source that moves the movable part, in which:
the fixing part includes a base having a flat plate shape,
the base includes a thick part and a thin part thinner than the thick part, and
a reinforcing plate is embedded in the thin part.

A camera module according to the present invention includes:
the lens driving device described above;
the lens part that is attached to the movable part; and
an image-capturing part that captures a subject image formed by the lens part.

A camera mounting device according to the present invention is an information device or a transport device, and includes:
the camera module described above; and
an image-processing part that processes image information obtained by the camera module.

Advantageous Effects of Invention

According to the present invention, it is possible to achieve miniaturization and weight reduction of a lens driving device, a camera module, and a camera mounting device.

BRIEF DESCRIPTION OF DRAWINGS

FIGS. 1A and 1B illustrate a smartphone on which a camera module according to an embodiment of the present invention is mounted;

DESCRIPTION OF EMBODIMENTS

Hereinafter, a preferred embodiment of the present invention will be described in detail with reference to the accompanying drawings.

FIGS. 1A and 1B illustrate smartphone M (camera mounting device) on which camera module A according to an embodiment of the present invention is mounted. FIG. 1A is a front view of smartphone M, and FIG. 1B is a rear view of smartphone M.

Camera module A is mounted, for example, as rear camera OC, on smartphone M. Camera module A has an AF function and an OIS function, and is capable of photographing an image without image blurring by automatically performing focusing when a subject is photographed and by optically correcting shake (vibration) generated during photographing.

Figure 2:
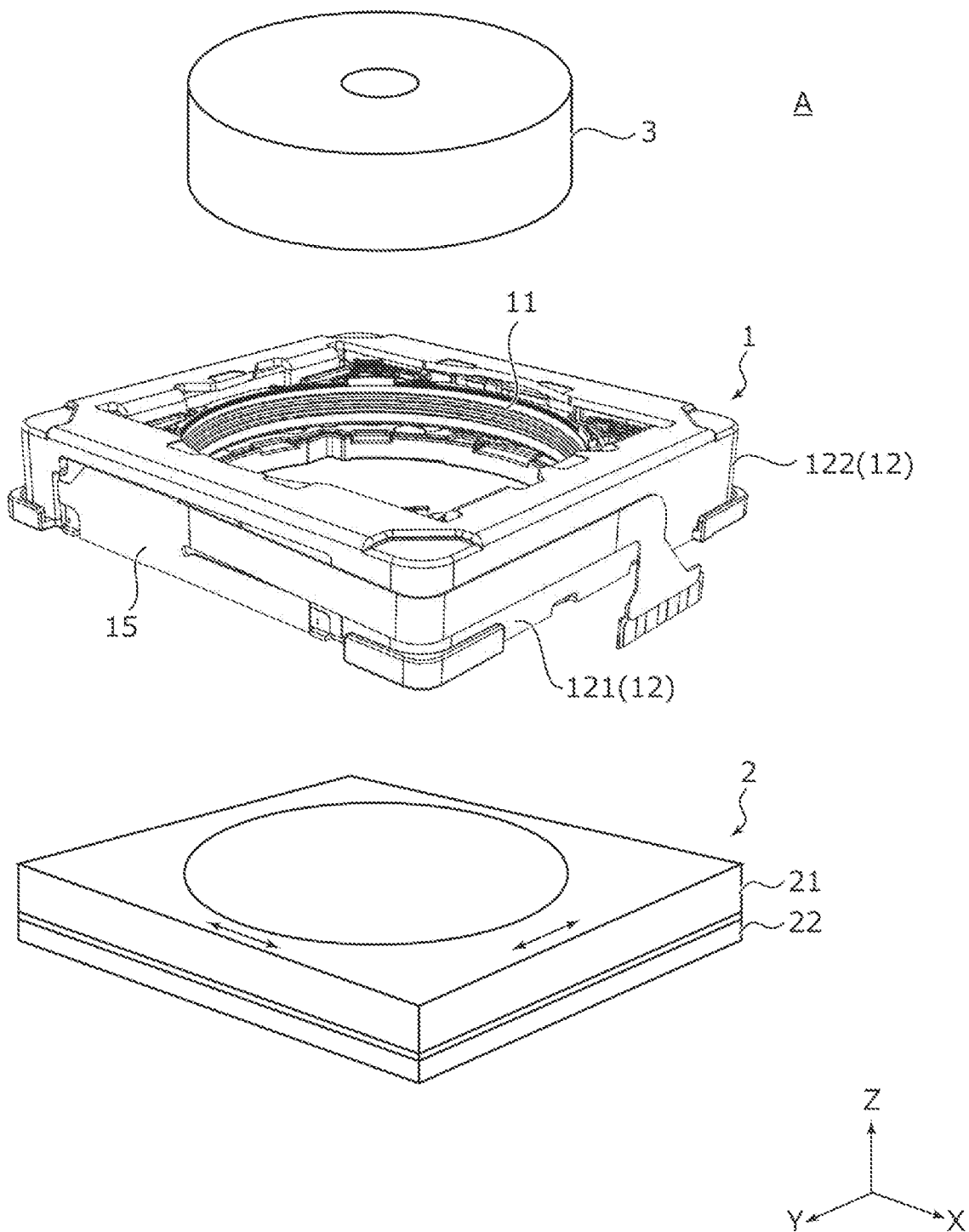
FIG. 2 is an exploded perspective view of the camera module.

FIG. 2 is an exploded perspective view of camera module A. As illustrated in FIG. 2, description will be given in the present embodiment using an orthogonal coordinate system (X, Y, Z). The same orthogonal coordinate system (X, Y, Z) is also used for illustration of the drawings to be described later.

Camera module A is mounted such that the X direction is an up-down direction (or a left-right direction), the Y direction is a left-right direction (or an up-down direction), and the Z direction is a front-rear direction in a case where photographing is actually performed with smartphone M. That is, the Z direction is the optical axis direction, the upper side in the drawings is a light reception side in the optical axis direction, and the lower side in the drawings is an image formation side in the optical axis direction. Further, the X and Y directions orthogonal to the Z axis are each referred to as "optical axis-orthogonal direction" and the XY plane is referred to as "optical axis-orthogonal plane".

As illustrated in FIG. 2, camera module A includes AF lens driving device 1 that realizes the AF function, OIS lens driving device 2 that realizes the OIS function, lens part 3 in which a lens is housed in a lens barrel having a cylindrical shape, and an image-capturing part (whose illustration is omitted) that captures a subject image formed by lens part 3, and the like.

AF lens driving device 1 and OIS lens driving device 2 are configured independently, and it is configured such that camera module A can be assembled using AF lens driving device 1 and OIS lens driving device 2, which are manufactured separately.

The image-capturing part (whose illustration is omitted) is disposed in OIS lens driving device 2 on the image formation side in the optical axis direction. The image-capturing part includes, for example, an image sensor board, and an imaging element that is mounted on the image sensor board. The imaging element is formed of, for example, a charge-coupled device (CCD) image sensor, a complementary metal oxide semiconductor (CMOS) image sensor, or the like. The imaging element captures a subject image formed by lens part 3.

Note that, a control section that performs driving control of AF lens driving device 1 and OIS lens driving device 2 may be provided on the image sensor board of the image-capturing part or may be provided in a camera mounting device (smartphone M in the present embodiment) on which camera module A is mounted.

For example, OIS lens driving device 2 is mounted on the image sensor board (whose illustration is omitted) of the image-capturing part and is mechanically and electrically connected thereto. OIS lens driving device 2 includes OIS movable part 21 (shake-correcting movable part), OIS fixing part 22 (shake-correcting fixing part), and an OIS driving part (whose illustration is omitted). OIS movable part 21 is connected to OIS fixing part 22 such that OIS movable part 21 is movable in the optical axis-orthogonal plane. The OIS driving part is a driving source for moving OIS movable part 21 in the optical axis-orthogonal plane and, for example, a voice coil motor (VCM), an ultrasonic motor (USM), or a driving means utilizing a shape memory alloy (SMA) (see PTLs 1 to 3) can be applied thereto. Further, for example, a driving means of a tilt system may be applied to the OIS driving part.

AF lens driving device 1 is fixed to OIS movable part 21 of OIS lens driving device 2, and is configured to be movable together with OIS movable part 21 in the optical axis-orthogonal plane. AF lens driving device 1 is mechanically and electrically connected to, for example, OIS fixing part 22 via flexible printed circuit board 15 (hereinafter, referred to as "FPC 15"). Note that, FPC 15 may be mechanically and electrically connected to the image sensor board on which OIS lens driving device 2 is mounted.

Figure 3:
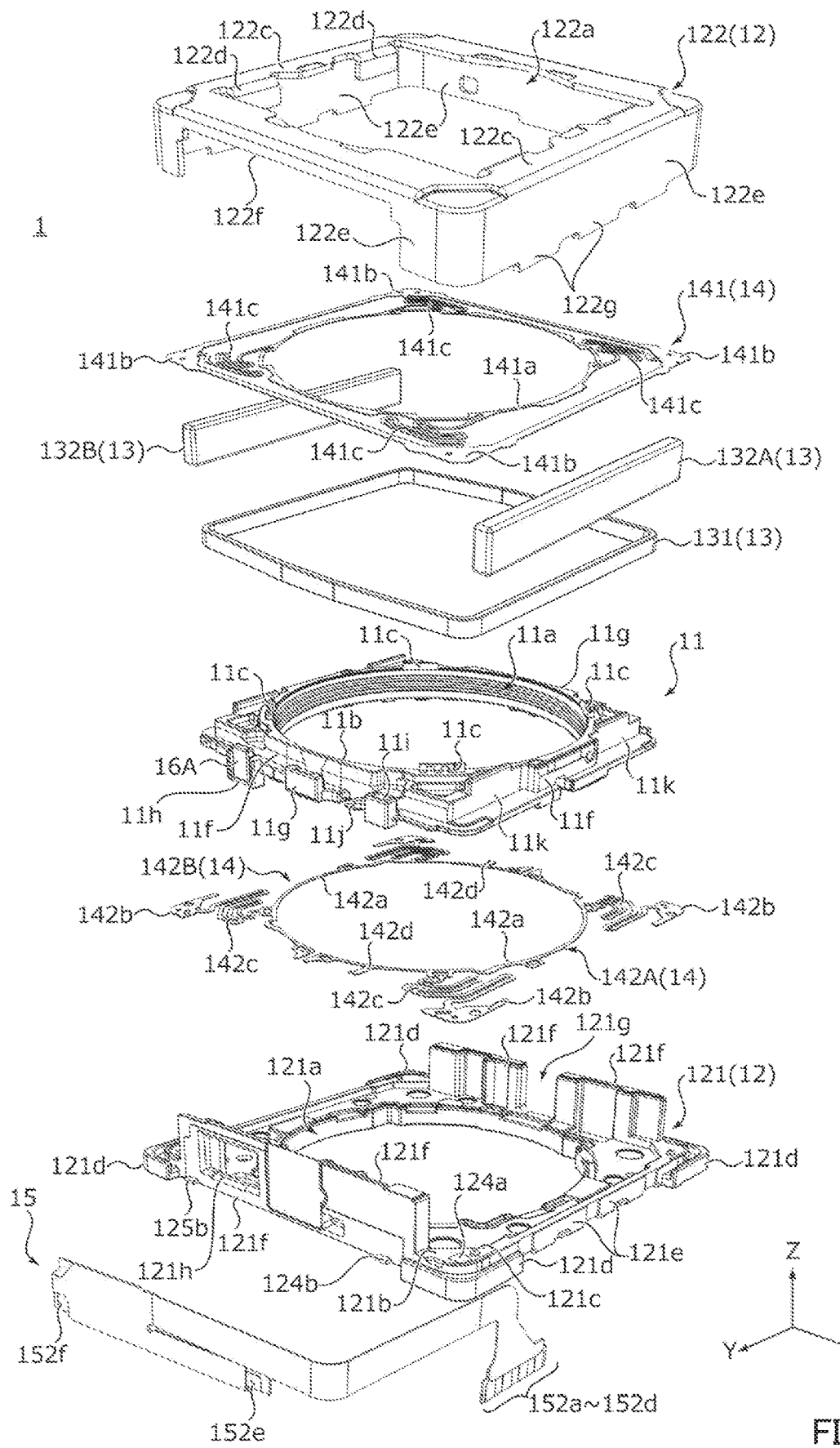
FIG. 3 is an exploded perspective view of an AF lens driving device.
Figure 4:
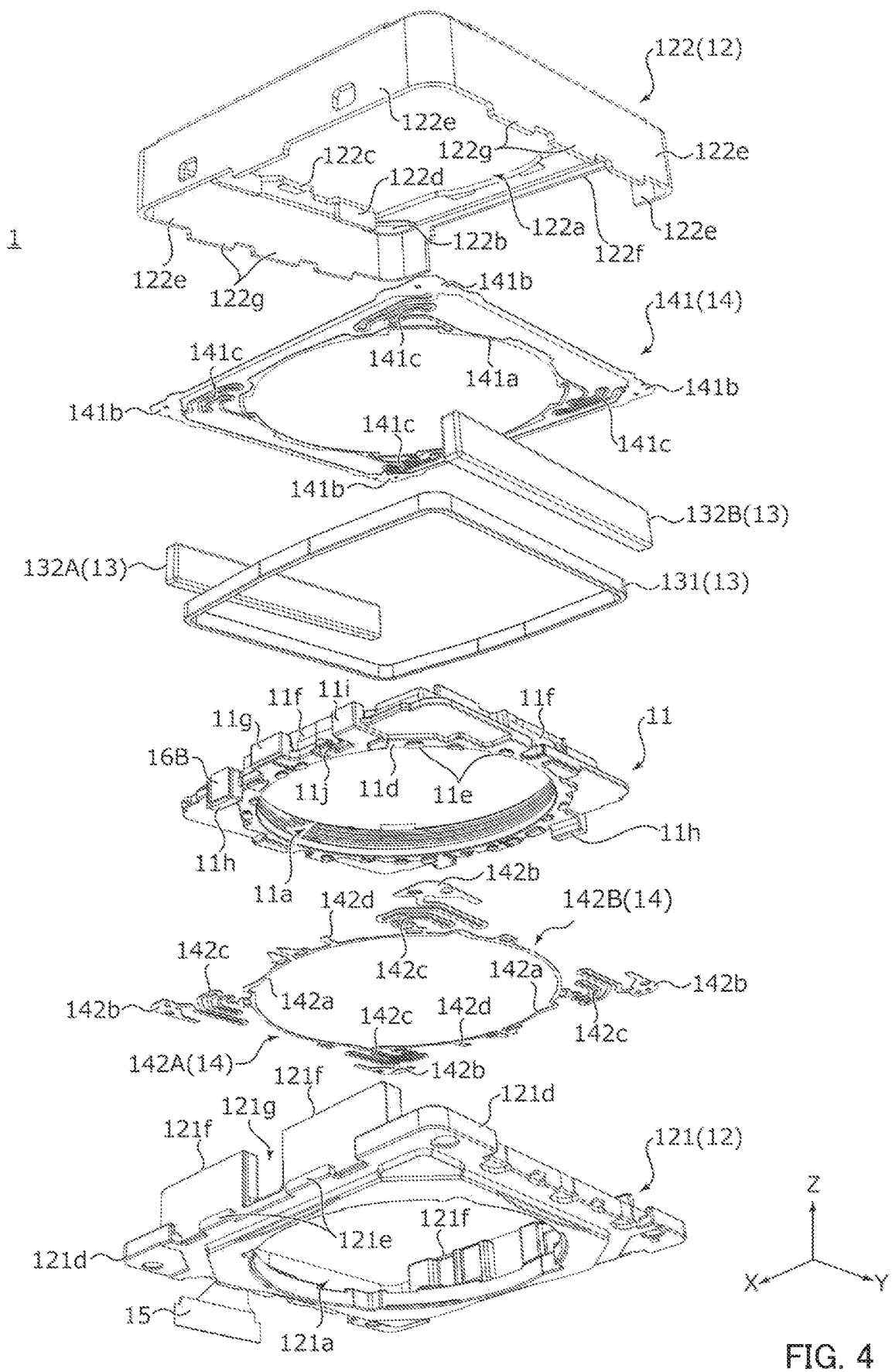
FIG. 4 is an exploded perspective view of the AF lens driving device.

FIGS. 3 and 4 are exploded perspective views of AF lens driving device 1. FIG. 3 is an upper perspective view, and FIG. 4 is a lower perspective view.

As illustrated in FIGS. 3 and 4, AF lens driving device 1 includes AF movable part 11, AF fixing part 12, AF driving part 13, AF support part 14, FPC 15 and the like. In the present embodiment, a voice coil motor is applied as AF driving part 13 to AF lens driving device 1.

AF movable part 11 is a portion that moves in the optical axis direction with respect to AF fixing part 12 during focusing. In the present embodiment, AF coil 131 that forms AF driving part 13 is attached to AF movable part 11.

AF fixing part 12 is a portion that supports AF movable part 11 via AF support part 14. In the present embodiment, driving magnets 132A and 132B (AF magnets) that form AF driving part 13 are attached to AF fixing part 12.

That is, AF driving part 13 that is the driving source of AF lens driving device 1 employs a moving coil system.

AF movable part 11 is disposed so as to be apart from AF fixing part 12 in the radial direction, and is coupled to AF fixing part 12 by AF support part 14.

In the present embodiment, AF movable part 11 is formed of a lens holder (hereinafter, AF movable part 11 will be referred to as "lens holder 11"). AF fixing part 12 is formed of base 121 and yoke 122. Further, AF support part 14 is formed of upper spring 141 and lower springs 142A and 142B. Upper spring 141 supports lens holder 11 on the light reception side in the optical axis direction (upper side) with respect to AF fixing part 12. Lower springs 142A and 142B support lens holder 11 on the image formation side in the optical axis direction (lower side) with respect to AF fixing part 12.

Lens holder 11 is formed of, for example, a resin material such as a liquid crystal polymer (LCP). Lens holder 11 is formed in a rectangular shape (here, a square shape) in plan view, and includes lens-housing part 11a at the center. Lens part 3 (see FIG. 2) is fixed to lens-housing part 11a by screwing and bonding. Upper spring 141 is fixed to peripheral part 11b of lens-housing part 11a on the light reception side in the optical axis direction (hereinafter, peripheral part 11b will be referred to as "upper spring-fixing part 11b"). Upper spring-fixing part 11b is provided with four positioning pieces 11c protruding on the light reception side in the optical axis direction. Upper spring 141 is positioned with positioning pieces 11c.

Lower springs 142A and 142B are fixed to peripheral part 11d of lens-housing part 11a on the image formation side in the optical axis direction (hereinafter, peripheral part 11d will be referred to as "lower spring-fixing part 11d"). Lower spring-fixing part 11d is provided with positioning pieces 11e protruding on the image formation side in the optical axis direction. Lower springs 142A and 142B are positioned with positioning pieces 11e.

AF coil 131 is wound around side 11f of lens-housing part 11a (hereinafter, side 11f will be referred to as "coil winding part 11f"). Coil winding part 11f is formed in a rectangular shape as a whole, and is partially provided with notches 11k. The shape of AF coil 131 is defined by coil winding part 11f. Further, insertion pieces 122d of yoke 122 are inserted between AF coil 131 and notches 11k provided in portions of coil winding part 11f along the Y direction.

In two outer-side parts of lens holder 11 along the X direction, each substantially center thereof in the longitudinal direction is provided with rotation-regulating piece 11g. Further, magnet-housing part 11h is provided on one side of rotation-regulating piece 11g, and counterweight part 11i is provided on the opposite side thereof. Magnet-housing parts 11h are provided at positions that are point symmetrical with respect to the optical axis, and counterweight parts 11i are provided at positions that are point symmetrical with respect to the optical axis.

In the X direction, AF coil 131 is disposed between rotation-regulating piece 11g, magnet-housing part 11h and counterweight part 11i, and coil winding part 11f.

AF coil 131 is an air-core coil that is energized during focusing. Portions of AF coil 131 along the Y direction face driving magnets 132A and 132B. Both ends of AF coil 131 are tied to tying parts 11j of lens holder 11, respectively, and are electrically connected to lower springs 142A and 142B. AF coil 131 is energized via lower springs 142A and 142B. Energization current flowing through AF coil 131 is controlled by control IC 151 (see FIG. 6B).

Position-detecting magnets 16A and 16B are disposed in magnet housing parts 11h of lens holder 11. Position-detecting magnet 16A is disposed in one magnet-housing part 11h and faces control IC 151. Position-detecting magnet 16B is disposed in another magnet-housing part 11h. Position-detecting magnet 16A is used for detecting the position of lens holder 11 in the optical axis direction. Position-detecting magnet 16B is a dummy magnet that is not used for detecting the position of lens holder 11. Position-detecting magnet 16B is disposed for balancing the weight of lens holder 11 and a magnetic force that acts on lens holder 11 to stabilize the attitude of lens holder 11.

In the present embodiment, driving magnets 132A and 132B are disposed along the Y direction, and position-detecting magnets 16A and 16B are disposed on sides along the X direction. It is possible to suppress the influence of magnetism of driving magnets 132A and 132B on position-detecting magnets 16A and 16B by disposing driving magnets 132A and 132B away from position-detecting magnets 16A and 16B as much as possible. Thus, the accuracy of detecting the position of lens holder 11 in the optical axis direction improves, and the reliability improves.

In AF fixing part 12, base 121 is formed of, for example, a resin material such as a liquid crystal polymer (LCP). Base 121 is formed in a rectangular shape (here, a square shape) in plan view, and includes opening 121a having a circular shape at the center.

At four corners of base 121, lower springs 142A and 142B are fixed to surfaces 121b on the light reception side in the optical axis direction (hereinafter, surface 121b will be referred to as "lower spring-fixing part 121b"). Lower spring-fixing part 121b includes positioning boss 121c protruding on a side of lens holder 11 (on the light reception side in the optical axis direction). Lower springs 142A and 142B are positioned with positioning bosses 121c. In base 121, lower spring-fixing parts 121b are formed to swell out on the light reception side in the optical axis direction rather than other portions. Thus, lower springs 142A and 142B can be elastically deformed on the image formation side in the optical axis direction, and lens holder 11 can move onto the image formation side in the optical axis direction.

Yoke attachment pieces 121d and 121e on which yoke 122 is placed are provided on a peripheral edge of a lower part of base 121. Yoke 122 is positioned with yoke attachment pieces 121d and 121e. York 122 is fixed, for example, by bonding, in a state in which york 122 is placed on yoked attachment pieces 121d and is fitted into yoked attachment pieces 121e.

Sides of base 121 along the X direction are provided with upright walls 121f protruding on the light reception side in the optical axis direction. At each side, upright wall 121f is divided at substantially the center in the longitudinal direction. Rotation-regulating piece 11g of lens holder 11 is disposed in space 121g between two upright walls 121f (hereinafter, space 121g will be referred to as "rotation-regulating part 121g"). Further, FPC 15 is fixed to an outer surface of one upright wall 121f (on the front side in FIG. 4), and yoke 122 is fixed to an outer surface of another upright wall 121f (on the rear side in FIG. 4). IC housing part 121h is provided in one upright wall 121f.

Figure 5A:
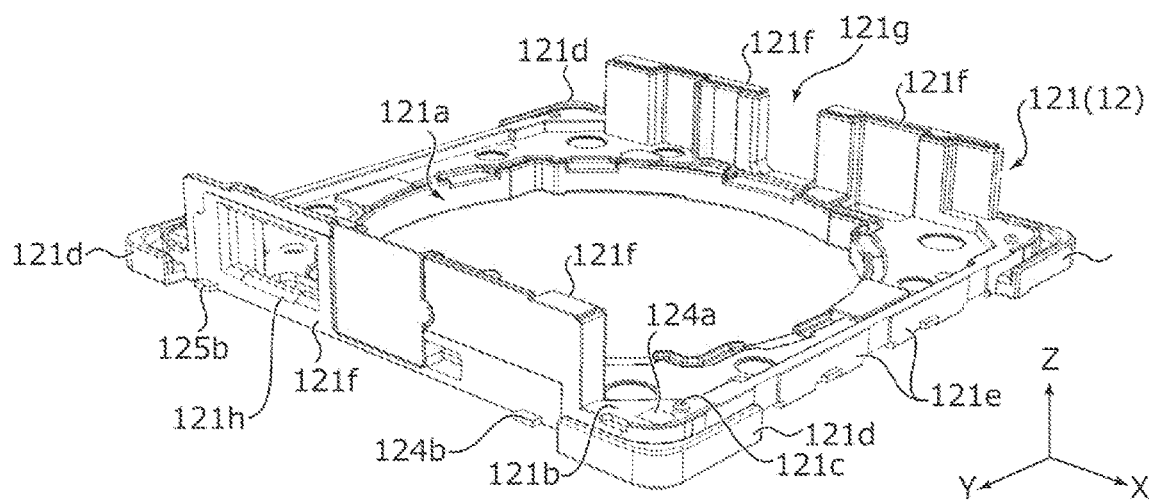
FIGS. 5A to 5C are perspective views of a structure of a base.
Figure 5B:
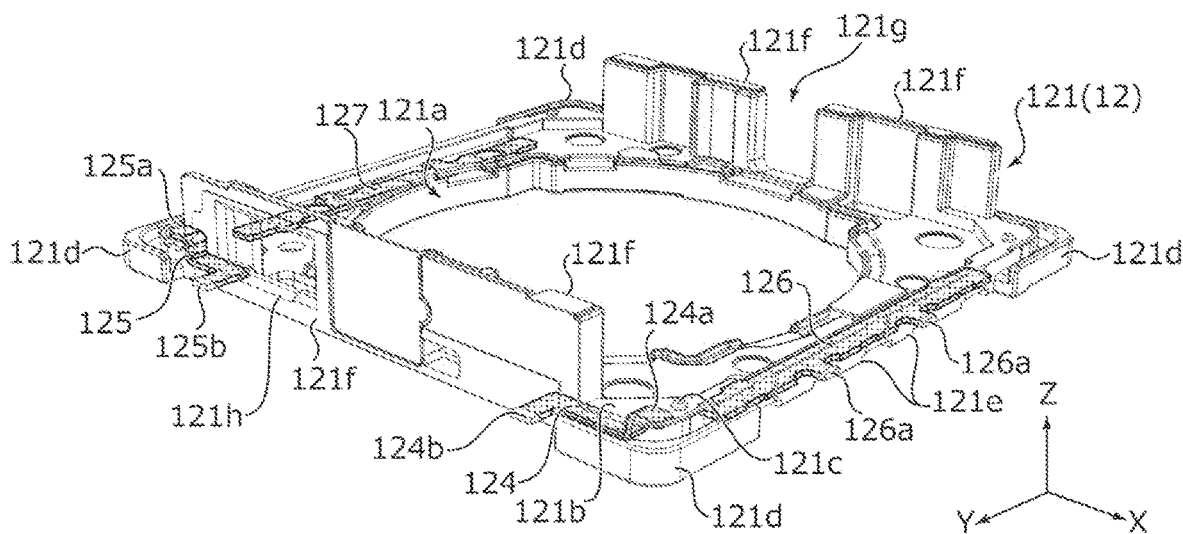
Figure 5C:
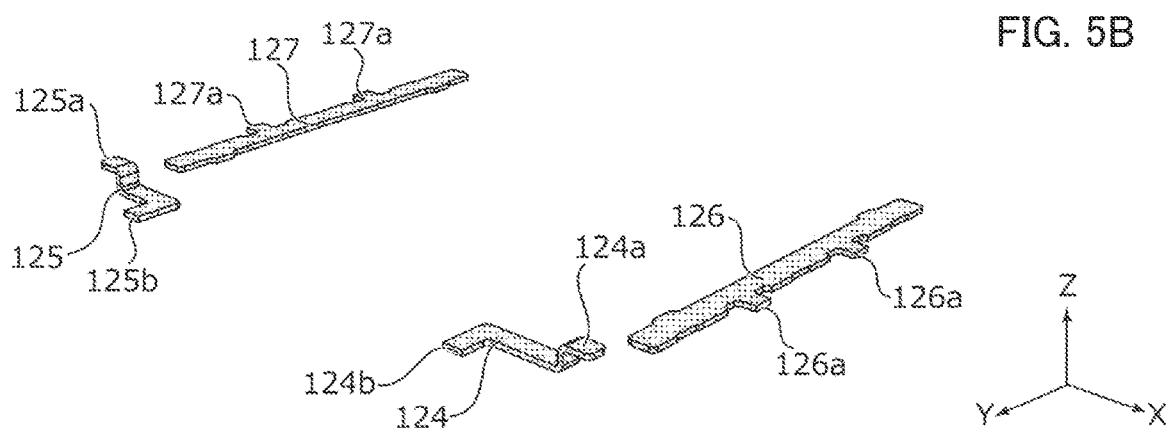

Further, two terminal metal fittings 124 and 125 and two reinforcing plates 126 and 127 are embedded in base 121 (see FIGS. 5A to 5C). FIG. 5A is an external perspective view of base 121. FIG. 5B is a perspective view of base 121. FIG. 5C is an external perspective view of terminal metal fittings 124 and 125 and reinforcing plates 126 and 127.

Terminal metal fittings 124 and 125 and reinforcing plates 126 and 127 are formed of, for example, a metal material such as a brass foil, and are formed integrally with base 121 by insert-molding.

Terminal metal fittings 124 and 125 are disposed on one side of base 121 along the X direction. One end parts 124a and 125a and another end parts 124b and 125b of terminal metal fittings 124 and 125 are exposed from base 121.

One end parts 124a and 125a of terminal metal fittings 124 and 125 are soldered to base-fixing parts 142b and 142b of lower springs 142A and 142B, and are mechanically and electrically connected thereto. Another end parts 124b and 125b of terminal metal fittings 124 and 125 are soldered to coil power supply terminals 152e and 152f of FPC 15, and are mechanically and electrically connected thereto.

Reinforcing plates 126 and 127 are disposed on sides of base 121 along the Y direction. Reinforcing plates 126 and 127 include yoke attachment parts 126a and 127a. An adhesive is applied to yoke attachment parts 126a and 127a when yoke 122 is attached to base 121. Since the bonding strength when yoke 122 is attached to base 121 improves by an anchor effect, falling impact resistance improves.

Portions of base 121 along the Y direction are thinner than portions thereof along the X direction. The thick portions of base 121 along the X direction are provided with upright walls 121f and are therefore capable of ensuring a certain strength even when the thickness of the thick portions of base 121 along the X direction is thinned. On the other hand, it is difficult to provide the thin portions of base 121 along the Y direction with reinforcing portions such as upright walls 121f since driving magnets 132A and 132B are located in the thin portions of base 121 along the Y direction on the light reception side in the optical axis direction. That is, when the thickness of the portions of base 121 along the Y direction is thinned to meet a request for height reduction, the strength of the portions of base 121 along the Y direction decreases.

In the present embodiment, the strength of base 121 is ensured by disposing reinforcing plates 126 and 127 in the thin portions of base 121 along the Y direction.

That is, in AF lens driving device 1, base 121 includes a thick part (portions along the X direction), and a thin part (portions along the Y direction) thinner than the thick part, and reinforcing plates 126 and 127 are embedded in the thin part.

Thus, it is possible to thin the thickness of the portions of base 121 along the Y direction, and it is possible to achieve height reduction.

Yoke 122 is formed of a magnetic material such as SPC material. Yoke 122 also functions as a housing cover that covers constituent elements of AF lens driving device 1. Since the number of components decreases by utilizing yoke 122 as the housing cover, weight reduction can be achieved and the man hour for assembly can also be reduced.

Yoke 122 is formed in a rectangular shape (here, a square shape) in plan view, and includes opening 122a having a substantially rectangular shape at the center. Lens part 3 faces the outside through opening 122a.

At four corners of yoke 122, upper spring 141 is fixed to rear surfaces 122b of a top plate (hereinafter, rear surface 122b will be referred to as "upper spring-fixing part 122b"). In the top plate of yoke 122, upper spring-fixing part 122b is formed to be recessed on the image formation side in the optical axis direction with respect to other portions of yoke 122. Thus, arm part 141c of upper spring 141 can be elastically deformed on the light reception side in the optical axis direction, and lens holder 11 can move onto the light reception side in the optical axis direction.

In yoke 122, driving magnets 132A and 132B are fixed to the inner surfaces of two side walls 122e along the Y direction. Driving magnets 132A and 132B are fixed to side walls 122e by bonding, for example. Driving magnets 132A and 132B are magnetized opposite to each other in the inner-outer direction.

Driving magnets 132A and 132B on the light reception side in the optical axis direction are covered by eaves parts 122c of the top plate along the Y direction. Further, eaves parts 122c are provided with insertion pieces 122d hanging in the Z direction. Insertion pieces 122d are inserted between AF coil 131 and notches 11k provided in lens holder 11. Insertion pieces 122d face driving magnets 132A and 132B with AF coil 131 therebetween. In a magnetic circuit formed by yoke 122 and driving magnets 132A and 132B, a magnetic flux efficiently intersects AF coil 131, and thus the driving efficiency improves.

In yoke 122, notch 122f having a shape corresponding to one upright wall 121f of base 121 is provided in one side wall 122e along the X direction (side wall 122e on the front side in FIG. 4). Further, upright wall 121f of base 121 is fixed to the inner surface of another side wall 122e along the X direction (side wall 122e on the rear side in FIG. 4) by bonding, for example.

Further, base engaging parts 122g that engage with yoke attachment pieces 121d and 121e of base 121 are provided in a lower end portion of yoke 122 on the image formation side in the optical axis direction.

Upper spring 141 is, for example, a leaf spring made of a metal material such as beryllium copper, nickel copper, and stainless steel. Upper spring 141 elastically supports lens holder 11 with respect to AF fixing part 12 (yoke 122).

Upper spring 141 is molded by punching one sheet metal, for example. Upper spring 141 includes lens holder-fixing part 141a, yoke-fixing part 141b, and arm part 141c. Lens holder-fixing part 141a has a shape corresponding to upper spring-fixing part 11b of lens holder 11, and is notched at portions corresponding to positioning pieces 11c. Yoke-fixing parts 141b are provided at four corners of upper spring 141, and have a shape corresponding to upper spring-fixing part 122b of yoke 122. Arm part 141c has a zigzag shape, and couples lens holder-fixing part 141a and yoke-fixing part 141b.

Upper spring 141 is positioned with respect to and fixed to lens holder 11 by engagement of notches (whose reference sign is omitted) of lens holder-fixing part 141a with positioning pieces 11c of lens holder 11. Further, upper spring 141 is fixed to yoke 122 by bonding of yoke-fixing parts 141b to upper spring-fixing parts 122b of yoke 122. When lens holder 11 moves in the optical axis direction, lens holder-fixing part 141a is displaced together with lens holder 11, and arm part 141c is elastically deformed.

Lower springs 142A and 142B are two leaf springs made of a metallic material such as beryllium copper, nickel copper, and stainless steel, for example. Lower springs 142A and 142B elastically supports lens holder 11 with respect to AF fixing part 12 (base 121).

Lower springs 142A and 142B are molded by punching one sheet metal, for example. Each of lower springs 142A and 142B includes lens holder-fixing part 142a, base-fixing part 142b, and arm part 142c. Lens holder-fixing part 142a has a shape corresponding to lower spring-fixing part 11d of lens holder 11. Base-fixing parts 142b are provided at four corners of lower springs 142A and 142B, and have a shape corresponding to lower spring-fixing part 121b of base 121. Arm part 142c has a zigzag shape, and couples lens holder-fixing part 142a and base-fixing part 142b.

Each of lower springs 142A and 142B includes tying connection part 142d in lens holder-fixing part 142a. Tying connection part 142d is electrically connected to AF coil 131 wound around tying part 11j of lens holder 11. Base-fixing parts 142b are electrically connected to terminal metal fittings 124 and 125 disposed in base 12. Power is supplied to AF coil 131 via lower springs 142A and 142B.

Lower springs 142A and 142B are positioned with respect to and fixed to lens holder 11 by insertion and fitting of positioning pieces 11c of lens holder 11 into fixation holes (whose reference sign is omitted) of lens holder-fixing parts 142a. Further, lower springs 142A and 142B are positioned with respect to and fixed to base 12 by insertion and fitting of positioning bosses 121c of base 12 into fixation holes (whose reference sign is omitted) of base-fixing parts 142b. When lens holder 11 moves in the optical axis direction, lens holder-fixing part 142a is displaced together with lens holder 11, and arm part 142c is elastically displaced.

FPC 15 is a flexible board in which a conductor pattern (electric circuit) made of a conductive metal material such as a copper foil is formed in a film-like base material made of an insulating resin material (for example, polyimide). ContrFPCol IC 151 is mounted on FPC 15. The conductor pattern includes power supply terminals 152a and 152b, signal terminals 152c and 152d, coil power supply terminals 152e and 152f, and wiring (whose illustration is omitted). The wiring is formed on front and rear surfaces of FPC 15, for example. The wiring formed on the front surface of the base material and the wiring formed on the rear surface of the base material are connected to each other via a through hole. In FPC 15, the front and rear surfaces are covered with a cover lay, and each of terminals 152a to 152f is exposed from the cover lay.

Power supply terminals 152a and 152b and signal terminals 152c and 152d are mechanically and electrically connected to OIS fixing part 22 of OIS lens driving device 2, for example.

Coil power supply terminals 152e and 152f are mechanically and electrically connected to end parts 124b and 125b of terminal metal fittings 124 and 125, respectively.

Each of terminals 152a to 152f is electrically connected to control IC 151 via the wiring.

Control IC 151 functions as a coil control section that controls energization current flowing through AF coil 131. Specifically, control IC 151 controls energization current flowing through AF coil 131 based on control signals inputted from signal terminals 152c and 152d and a detection result (Hall output) of a Hall element (whose illustration is omitted) built in control IC 151.

In AF lens driving device 1, power is supplied from control IC 151 to AF coil 131 via terminal metal fittings 124 and 125 and lower springs 142A and 142B.

The Hall element (whose illustration is omitted) that detects a change in a magnetic field by utilizing a Hall effect is built in control IC 151, and control IC 151 functions as a position detection part that detects the position of lens holder 11 in the optical axis direction. When lens holder 11 moves in the optical axis direction, a magnetic field generated by position-detecting magnet 16A changes. The Hall element detects this change in the magnetic field, and thereby the position of lens holder 11 in the optical axis direction is detected. A hall output proportional to an amount of movement of lens holder 11 can be obtained by designing the layouts of the Hall element and position-detecting magnet 16A such that a magnetic flux proportional to the amount of movement of lens holder 11 intersects a detection surface of the Hall element.

FPC 15 is fixed to upright wall 121f of base 121 by bonding, for example. At this time, control IC 151 is inserted and fitted into IC housing part 121h of base 121.

Figure 6A:
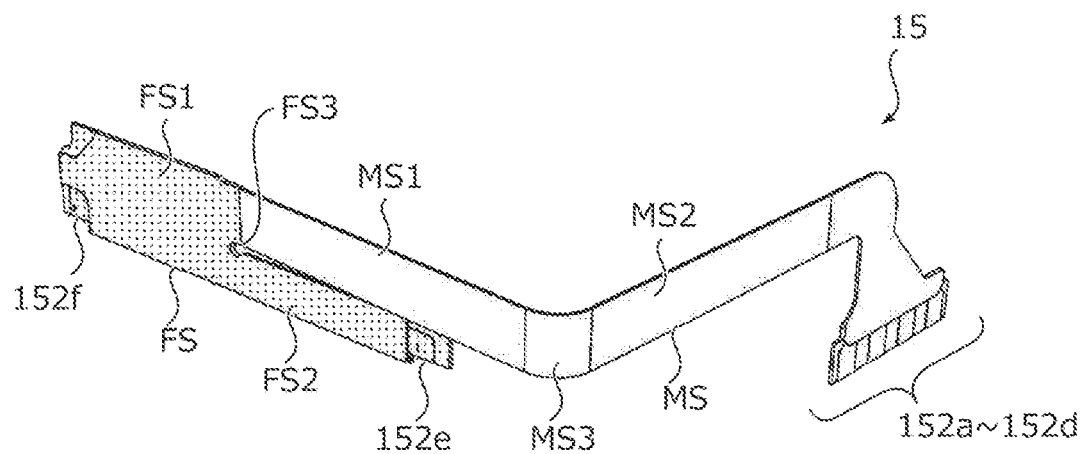
FIGS. 6A and 6B are perspective views of a flexible printed circuit board.
Figure 6B:
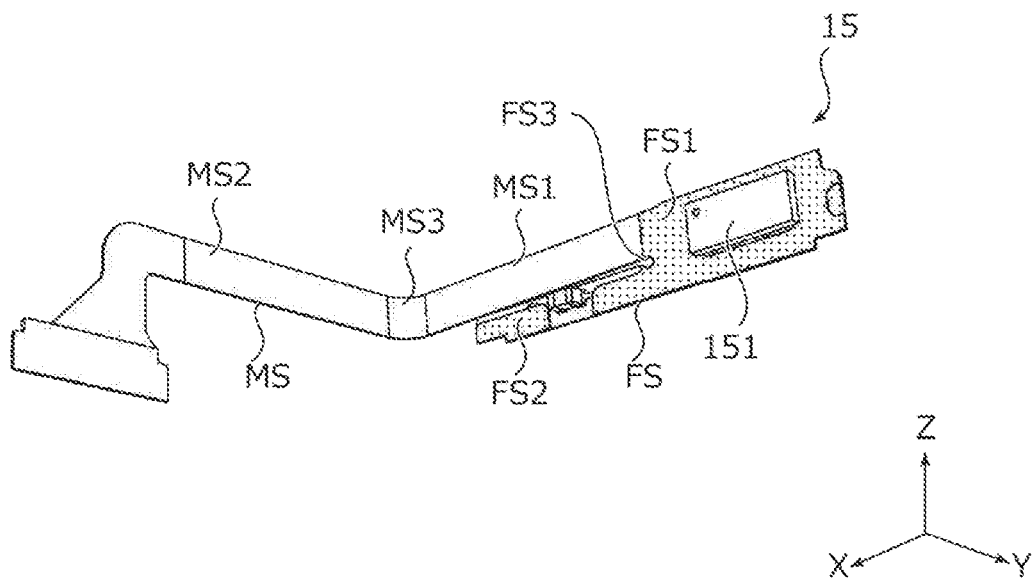

As illustrated in FIGS. 6A and 6B, FPC 15 includes portion FS that is fixed to base 121 (hereinafter, portion FS will be referred to as "fixed board part FS"), and portion MS that is deformable following movement of base 121 in the optical axis-orthogonal plane, that is, following operation of AF lens driving device 1 during shake correction (hereinafter, portion MS will be referred to as "movable board part MS").

Fixed board part FS is partitioned into IC mounting part FS1 on which control IC 151 is mounted, and branch part FS2 which extends from IC mounting part FS1 and which is narrower than IC mounting part FS1. Movable board part MS is provided so as to connect, substantially parallel to branch part FS2, to IC mounting part FS1.

Movable board part MS is formed by being bent at a substantially right angle. Movable board part MS includes first extension part MS1 provided so as to connect to fixed board part FS (IC mounting part FS1), and second extension part MS2 provided so as to extend from first extension part MS1. Further, an end part of second extension part MS2 extends on the image formation side in the optical axis direction (a side of OIS lens driving device 2).

Figure 7A:
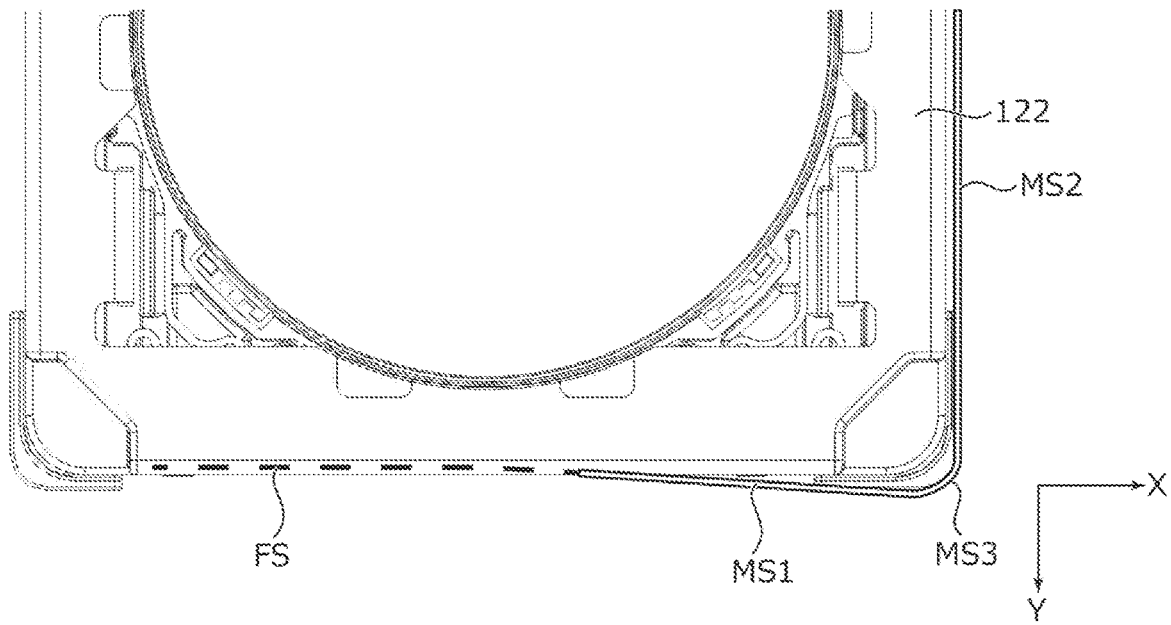
FIGS. 7A and 7B are plan views illustrating an attachment state of the flexible printed circuit board.
Figure 7B:
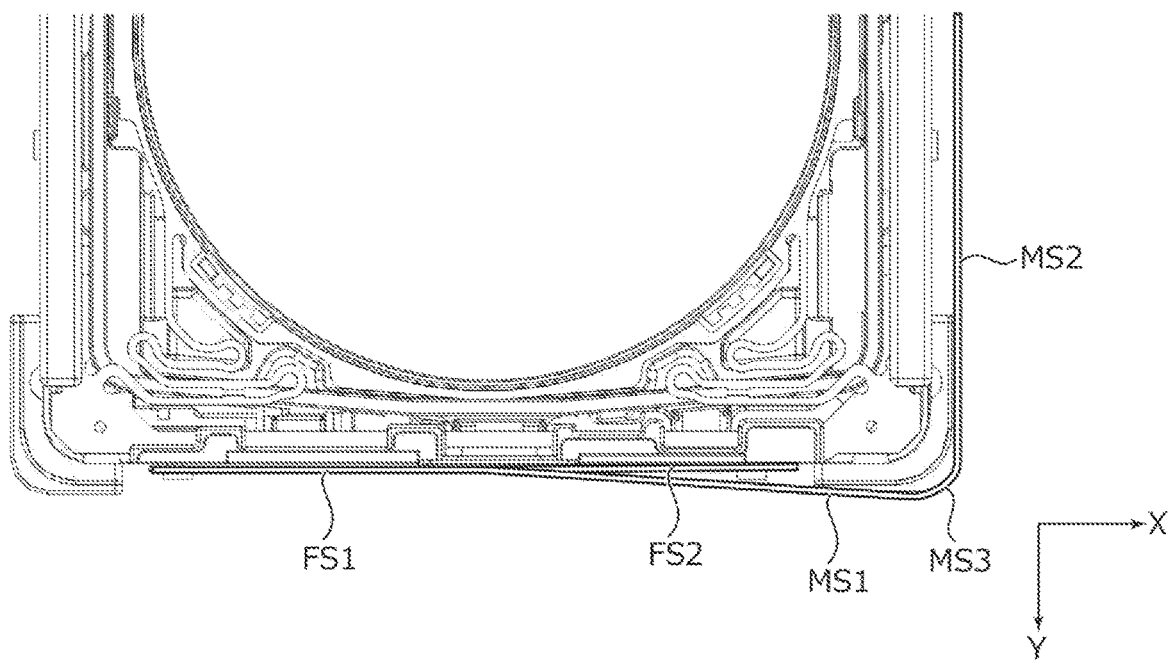

FIGS. 7A and 7B illustrate an attachment state of FPC 15. FIG. 7A is a plan view of AF lens driving device 1. FIG. 7B is a plan view of AF lens driving device 1 in a state in which yoke 122 is removed.

As illustrated in FIGS. 7A and 7B, first extension part MS1 is inclined with respect to the X direction, and second extension part MS2 is parallel to the Y direction. That is, first extension part MS1 is inclined with respect to a first side (a side along the X direction) that defines the outer shape of AF lens driving device 1, and second extension part MS2 is parallel to a second side (a side along the Y direction) adjacent to the first side.

Specifically, an extension direction (first direction) of first extension part MS1 and an extension direction (second direction) of second extension part MS2 form an angle equal to or larger than 60° and smaller than 90° (for example, 87°).

Thus, a portion extending from first extension part MS1 to bent part MS3 and yoke 122 are apart from each other to form a space, and thus FPC 15 can be easily deformed following a shake-correcting operation.

Since control IC 151 is mounted on fixed board part FS, a conductive pattern is formed on both surfaces of the base material. With respect to movable board part MS, on the other hand, a conductive pattern is formed only on one surface of the base material. That is, in the present embodiment, movable board part MS includes a fewer number of wiring layers and is thinner than fixed board part FS. Since the flexibility of movable board part MS improves thereby, the limitation of movement operation during shake correction by FPC 15 can be relaxed, and shake correction can be normally performed without any trouble.

Further, bent part MS3 between first extension part MS1 and second extension part MS2 is processed into a rounded shape. Thus, FPC 15 can respond more flexibly to a shake correction operation.

Further, a connection part between IC mounting part FS1 and first extension part MS1 is provided with notch FS3 having a rounded shape. Although a stress is applied to the connection part between IC mounting part FS1 and first extension part MS1 during shake correction, the stress can be dispersed by notch FS3 having a rounded shape.

In a case where automatic focusing is performed in AF lens driving device 1, AF coil 131 is energized. When AF coil 131 is energized, a Lorentz force is generated at AF coil 131 by interaction between magnetic fields of driving magnets 132A and 132B and current flowing through AF coil 131. The direction of the Lorentz force is a direction (Z direction) orthogonal to the directions of the magnetic fields generated by driving magnets 132A and 132B and the direction of the current flowing through AF coil 131. Since driving magnets 132A and 132B are fixed, a reaction force acts on AF coil 131. This reaction force serves as a driving force of the AF voice coil motor, lens holder 11 to which AF coil 131 is attached moves in the optical axis direction and focusing is performed.

At the time of no energization when focusing is not performed, AF movable part 11 is held in a state of being suspended between an infinity position and a macro position by upper spring 141 and lower springs 142A and 142B, for example (hereinafter, this state will be referred to as "reference state"). That is, AF movable part 11 is elastically supported so as to be displaceable on both sides in the optical axis direction in a state where AF movable part 10 is positioned with respect to AF fixing part 12 by upper spring 141 and lower springs 142A and 142B. When focusing is performed, the direction of current is controlled in accordance with whether AF movable part 11 is moved from the reference state onto a side of the macro position or onto a side of the infinity position. Further, the magnitude of current is controlled in accordance with the movement distance (stroke) of AF movable part 11 from the reference state.

Energization current flowing through AF coil 131 is controlled by control IC 151. Specifically, control IC 151 controls energization current flowing through AF coil 131 based on control signals supplied via FPC 15 and a detection result of the Hall element (whose illustration is omitted) built in control IC 151.

That is, in AF lens driving device 1, closed loop control based on a Hall output is completed within control IC 151. According to a closed loop control system, it is not necessary to consider hysteresis characteristics of the voice coil motor and it is possible to directly detect that the position of lens holder 11 is stabilized. Further, it is also possible to cope with automatic focusing using an image surface detection system. Accordingly, the response performance is high and autofocus operation can be increased in speed.

As described above, AF lens driving device 1 (lens driving device) according to the present embodiment includes: AF fixing part 12 (fixing part); AF movable part 11 (movable part) configured to be capable of holding lens part 3 and movably connected to AF fixing part 12; and AF driving part 13 (driving source) that moves AF movable part 11. AF fixing part 12 includes base 121 having a flat plate shape. Base 121 includes thick portions (thick part) along the Y direction and thin portions (a thin part thinner than the thick part) along the X direction. Reinforcing plates 126 and 127 are embedded in the thin portions along the X direction.

According to AF lens driving device 1, the thin portions of base 12 along the X direction are reinforced by reinforcing plates 126 and 127, and thus it is possible to thin the thickness of base 121. Accordingly, it is possible to achieve miniaturization and weight reduction of AF lens driving device 1, camera module A, and camera mounting device M.

Further, AF lens driving device 1 (lens driving device) includes FPC 15 (flexible printed circuit board) that supplies power to AF driving part 13 (driving source). FPC 15 includes fixed board part FS that is fixed to AF fixing part 12, and movable board part MS that is deformable following movement of base 121 (AF fixing part 12) in the optical axis-orthogonal plane. Movable board part MS includes first extension part MS1, second extension part MS2, and bent part MS3 between first extension part MS1 and second extension part MS2, and is formed to be thinner than fixed board part FS. First extension part MS1 is provided so as to connect to fixed board part FS and extends in a first direction orthogonal to the optical axis direction. Second extension part MS2 is provided so as to extend from first extension part MS1 and extends in a second direction orthogonal to the optical axis direction. Since the limitation of movement operation during shake correction by FPC 15 can be relaxed thereby, shake correction can be performed normally without any trouble.

While the invention made by the present inventor has been specifically described thus far based on the preferred embodiment, the present invention is not limited to the preferred embodiment described above and can be modified without departing from the gist thereof.

For example, although smartphone M that is a camera-equipped mobile terminal has been described as an example of the camera mounting device including camera module A in the preferred embodiment, the present invention is applicable to a camera mounting device that includes a camera module; and an image-processing part that processes image information obtained by the camera module. The camera mounting device encompasses information devices and transport devices. The information devices include, for example, camera-equipped mobile phones, notebook personal computers, tablet terminals, mobile game machines, webcams, and camera-equipped in-vehicle devices (such as rear-view monitor devices and dashboard camera devices). Further, the transport devices include, for example, automobiles.

Figure 8A:
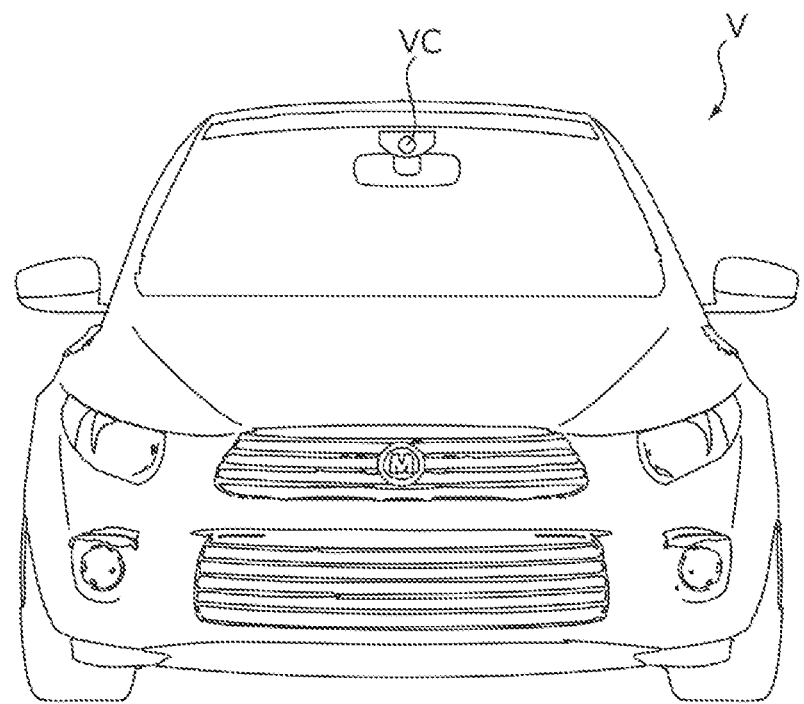
FIGS. 8A and 8B illustrate an automobile as a camera mounting device on which an in-vehicle camera module is mounted.
Figure 8B:
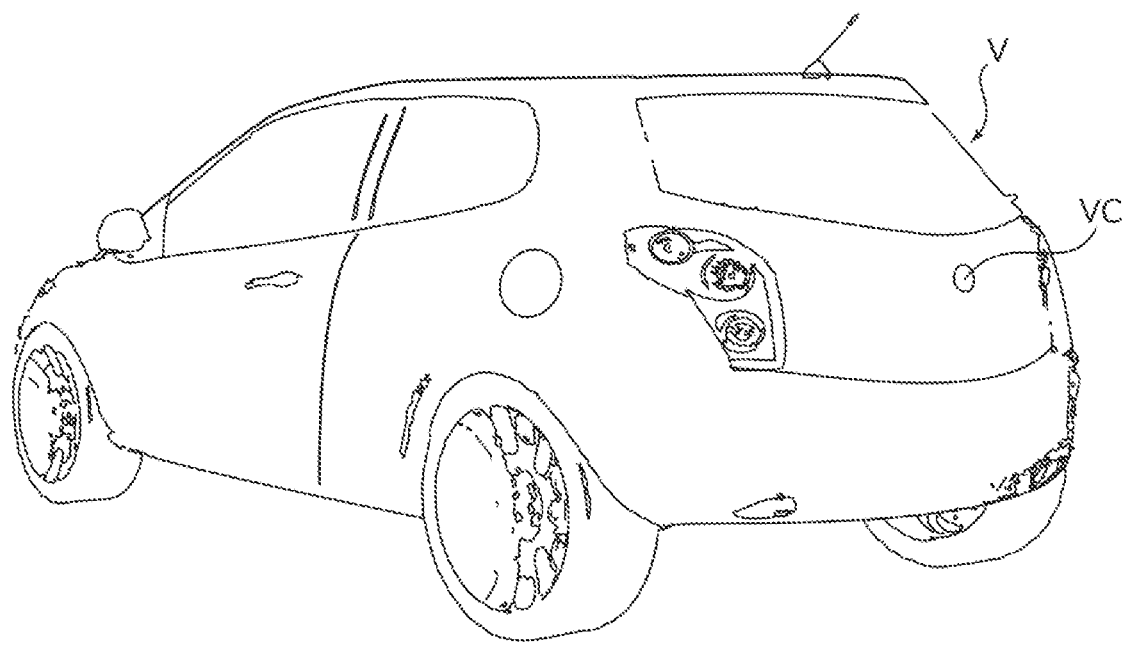

FIGS. 8A and 8B illustrate automobile V serving as a camera mounting device on which in-vehicle camera module vehicle camera (VC) is mounted. FIG. 8A is a front view of automobile V, and FIG. 8B is a rear perspective view of automobile V. On automobile V, camera module A described in the preferred embodiment is mounted as in-vehicle camera module VC. As illustrated in FIGS. 8A and 8B, in-vehicle camera module VC is attached to the windshield so as to face the front side, or is attached to the rear gate so as to face the rear side, for example. This in-vehicle camera module VC is used for a rear-view monitor, a dashboard camera, collision-prevention control, automated driving control, and the like.

Further, for example, the configurations in AF lens driving device 1 other than the configuration of reinforcing plates 126 and 127 that are embedded in base 121 can be appropriately changed.

Further, the configuration of AF driving part 13 is not limited to that indicated in the preferred embodiment. For example, in AF driving part 13, the shapes and placement of AF coil 131 and driving magnets 132A and 132B are arbitrary. Further, for example, AF driving part 13 may be of a moving coil system in which AF coil 131 is disposed in AF fixing part 12 and driving magnets 132A and 132B are disposed in the AF movable part. Further, an ultrasonic motor may be applied to AF driving part 13.

Further, the present invention is also applicable to the base member of OIS fixing part 22 of OIS lens driving device 2.

That is, the present invention is applicable to a base for which a thickness with sufficient strength cannot be ensured due to a request for height reduction, or the like.

The embodiment disclosed herein is merely an exemplification in every respect and should not be considered as limitative. The scope of the present invention is specified not by the above-mentioned description, but by the appended claims. The scope of the present invention is intended to include all modifications in so far as they are within the scope of the appended claims or the equivalents thereof.

This application is entitled to and claims the benefit of Japanese Patent Application No. 2018-234685 and Japanese Patent Application No. 2018-234695, both filed on Dec. 14, 2018, the disclosure of which including the specification, drawings and abstract is incorporated herein by reference in its entirety.

REFERENCE SIGNS LIST

1 AF lens driving device (lens driving device)
2 OIS lens driving device
3 Lens part
11 AF movable part, lens holder
12 AF fixing part
121 Base
122 Yoke
124, 125 Terminal metal fitting
126, 127 Reinforcing plate
13 AF driving part
131 AF coil
132A, 132B Driving magnet
14 AF support part
141 Upper spring
142A, 142B Lower spring
15 Flexible printed circuit board
151 Control IC
152a to 152f Terminal
16A, 16B Position-detecting magnet
A Camera module
M Smartphone (camera mounting device)
FS Fixed board part
MS Movable board part

The invention claimed is:

1. A lens driving device, comprising:
   a fixing part;
   a movable part configured to be capable of holding a lens part and movably connected to the fixing part;
   a driving source that is formed of a coil and a magnet and moves the movable part; and
   a yoke that forms a magnetic circuit together with the magnet, wherein:
   the fixing part includes a base having a flat plate shape,
   the base includes a thick part and a thin part thinner than the thick part,
   a reinforcing plate is embedded in the thin part,
   the magnet is located in the thin part on a light reception side in an optical axis direction,
   the reinforcing plate is partially exposed from the thin part, and
   the yoke is bonded to an exposed portion of the reinforcing plate.

2. The lens driving device according to claim 1, wherein the reinforcing plate is formed of a metal material and is embedded by insert-molding in the base made of a resin.

3. The lens driving device according to claim 1, which is fixed to a shake-correcting movable part configured to move in an optical axis-orthogonal plane during shake correction, and which moves in the optical axis-orthogonal plane together with the shake-correcting movable part, wherein the lens driving device comprises a flexible printed circuit board that supplies power to the driving source, wherein the flexible printed circuit board includes:
   a fixed board part that is fixed to the fixing part; and
   a movable board part that is deformable following movement of the fixing part in the optical axis-orthogonal plane, wherein
   the movable board part includes:
      a first extension part provided so as to connect to the fixed board part and extending in a first direction orthogonal to the optical axis direction;
      a second extension part provided so as to extend from the first extension part and extending in a second direction orthogonal to the optical axis direction; and
      a bent part between the first extension part and the second extension part, and wherein
   the movable board part is formed to be thinner than the fixed board part.

4. The lens driving device according to claim 3, wherein the bent part is formed in a rounded shape.

5. The lens driving device according to claim 3, wherein the first direction and the second direction form an angle equal to or larger than 60° and smaller than 90°.

6. The lens driving device according to claim 3, wherein:
   a control component is mounted on the fixed board part, the control component controlling the supplying of power to the driving source, and
   the movable board part includes a fewer number of wiring layers than the fixed board part.

7. The lens driving device according to claim 3, wherein:
   the lens driving device has an outer shape that is a rectangular shape in plan view when viewed from the optical axis direction,
   the first extension part is inclined with respect to a first side that forms the outer shape, and
   the second extension part is parallel to a second side adjacent to the first side.

8. The lens driving device according to claim 3, wherein a connection part between the fixed board part and the first extension part is provided with a notch having a rounded shape.

9. A camera module, comprising:
   the lens driving device according to claim 1;
   the lens part that is attached to the movable part; and
   an image-capturing part that captures a subject image formed by the lens part.

10. A camera mounting device, which is an information device or a transport device, the camera mounting device comprising:
    the camera module according to claim 9; and
    an image-processing part that processes image information obtained by the camera module.

11. The lens driving device according to claim 1, wherein the base has a rectangular shape,
    two of a plurality of the thick part are disposed respectively along two opposite sides of the rectangular shape, and
    two of a plurality of the thin part are disposed respectively along two sides different from the two opposite sides where the thick parts are disposed.

* * * * *